US007496626B2

(12) United States Patent
Kulkarni et al.

(10) Patent No.: US 7,496,626 B2
(45) Date of Patent: Feb. 24, 2009

(54) SYSTEM AND METHOD FOR ROLE PEN BASED MESSAGING IN A SYNCHRONOUS COLLABORATIVE ENVIRONMENT

(75) Inventors: Shrinivas S. Kulkarni, Bangalore (IN); Naveenkumar V. Muguda, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1337 days.

(21) Appl. No.: 10/732,109

(22) Filed: Dec. 10, 2003

(65) Prior Publication Data

US 2005/0144229 A1 Jun. 30, 2005

(51) Int. Cl.
*G06F 15/16* (2006.01)

(52) U.S. Cl. ..................... 709/204; 709/205

(58) Field of Classification Search .............. 709/204, 709/205
See application file for complete search history.

(56) References Cited

U.S. PATENT DOCUMENTS

| 5,495,269 | A | | 2/1996 | Elrod et al. ............ 345/179 |
| 6,128,014 | A | | 10/2000 | Nakagawa et al. ......... 345/341 |
| 6,334,141 | B1 | * | 12/2001 | Varma et al. ............ 709/205 |
| 2002/0056577 | A1 | | 5/2002 | Kaye et al. ............. 178/18.03 |
| 2002/0076025 | A1 | * | 6/2002 | Liversidge et al. ...... 379/202.01 |
| 2003/0097410 | A1 | * | 5/2003 | Atkins et al. ............ 709/206 |
| 2003/0236820 | A1 | * | 12/2003 | Tierney et al. ........... 709/203 |
| 2004/0107256 | A1 | * | 6/2004 | Odenwald et al. ......... 709/205 |
| 2004/0133639 | A1 | * | 7/2004 | Shuang et al. ............ 709/204 |

FOREIGN PATENT DOCUMENTS

WO WO 02/39308 5/2002

* cited by examiner

*Primary Examiner*—Krisna Lim
(74) *Attorney, Agent, or Firm*—VanLeeuwen & VanLeeuwen

(57) ABSTRACT

A system and method for role pen based messaging in a collaborative environment is presented. Online users utilize clients and a server to collaborate in a distributed presentation. One of the users is a presentation leader and sends presentation content to the server which distributes the presentation content to participating users. One of the users wishes to send a comment to a subset of the participating users. The user selects a role pen from a role pen stand whereby the role pen corresponds to a subset of the participating users. The user then generates a comment using his keyboard and/or mouse pointer, and the user's client sends the comment to recipient users' clients that correspond to the role pen. The recipient users' clients display the comment in the same window as the distributed presentation. Participating users that do not correspond to the role pen do not receive the comment.

3 Claims, 8 Drawing Sheets

SYSTEM AND METHOD FOR ROLE PEN BASED MESSAGING IN A SYNCHRONOUS COLLABORATIVE ENVIRONMENT

BACKGROUND OF THE INVENTION

1. Technical Field

The present invention relates in general to a system and method for role pen based messaging in a synchronous collaborative environment. More particularly, the present invention relates to a system and method for conversing with a subset of a plurality of users who are participating in a synchronous collaborative session.

2. Description of the Related Art

With the onset of advanced technology, online collaboration has become increasingly feasible. Online collaboration systems support groups of people that are engaged in a common task (or goal) by providing an interface to a shared environment. For example, users may use a distributed presentation tool on each of their client computers, such as Lotus e-Meeting or Windows NetMeeting, in order for the users to collaborate on a particular topic. As businesses become more global, and as businesses cut expenses, online collaboration has become a popular mechanism for users to participate in a meeting who are located at different geographic locations.

A challenge found with collaborative tools is their lack of ability for a user to intuitively converse with a subset of online collaboration participants. For example, a user may wish to revise a flowchart that is being presented on a display window during a distributed presentation. In this example, the user revises the flowchart using the same window as an existing presentation in order to provide intuitive feedback to other participants. Many tools exist that allows a user to broadcast a message to each participant, but these tools, however, do not allow a user to selectively send a message to a subset of participants.

For existing collaborative tools that support conversations with a selected group of users, a conversation originator has to create a separate chat window and invite other participants to join the chat window. Users involved in this conversation have to explicitly add other members to the conversation. If a participant wants to converse with different subsets of the participants of the collaborative session, he is required to open multiple chat windows. A challenge found is that a user must remember which users correspond to which chat windows and the proliferation of such chat windows makes online collaboration a tedious and ineffective task.

What is needed, therefore, is a system and method for a user to intuitively converse with different subsets of participants during a synchronous collaborative session using only one common shared display area such that common messages are visible to each participant and restricted messages are visible only to intended recipients.

SUMMARY

It has been discovered that the aforementioned challenges are resolved by using a role pen to selectively send a message to a subset of users that are participating in a synchronous collaborative session. A user creates a role pen and may associate one or more public roles, private roles, or individual user identifiers to the role pen. The user then selects the role pen and generates a comment (i.e. text and/or graphics) using an input device, such as a keyboard, mouse, or stylus. The user's client generates a message that includes the comment, and sends the message to a server which, in turn, sends the message to a subset of users.

A server supports a synchronous collaborative session between a plurality of users, each using collaborative client software to converse. One of the users initiates a discussion and uses his client to send session content to the server through a computer network. The server identifies which users are participating in the collaborative session, and sends the session content to each of the user's corresponding clients. For example, a company's division may be participating in a distributed presentation whereby users that correspond to each of the clients are part of the division.

One of the users reviews the presentation content, and wishes to send a review message to a subset of the users participating in the collaborative session. The user also wishes that his/her message is displayed on the same window as the main session content. The user creates a role pen and associates one or more public roles, private roles, and/or user identifiers to the role pen.

A public role is one which is maintained by the server's security system and corresponds to a grouping of plurality of users of the collaborative system where each user corresponds to a user ID which is maintained by a server's security system. A public role is visible to and accessible to each user of the system. Private roles also correspond to a group of users (user IDs) but are created and maintained by individual users using their client computers. A server is not aware of the existence of private roles.

If the user wishes to express comments only to employees belonging to "software department", he/she creates a role pen and adds the public role "software department" to the role pen. The pen is then stored in the role pen stand. Any message written using the role pen is visible to each employees belonging to that department. If a user wishes to send a message only to some of his/her team members, he/she creates a private role called "My Team" and adds user ID's of each intended recipient to that role. The user then creates a role pen and associates the newly created private role to the role pen. The user may also explicitly add a user ID to the role pen such as "co-op student".

When the user selects a role pen for writing and writes a comment using an input device, such as a keyboard, mouse, or stylus, the user's client software generates a message that includes the user's comment and public role identifiers associates with the role pen. If the role pen is associated with any private roles, the client also includes user ID's corresponding to the private role as well as explicit user identifiers corresponding to the role pen. Once the message is generated, the client sends the message to the server for message distribution.

The server receives the message and retrieves user ID's that correspond to the public role from a public role storage area. The server sends the message to users whose user ID's correspond to the included public role identifier as well as to user ID's that were included in the message. In addition, the message includes display attribute information which informs recipient clients as to how to display the comment.

When a recipient user receives the message, the recipient client displays the message in the same shared display area in which other messages are displayed. The recipient user may extract information from the delivered message such as whom the particular message is intended, its display attributes, etc. If interested in continuing the conversation with the same subset of users, the recipient user may export the role pen from the message and place the role pen in his/her role pen stand so that it may be used for future writing. While exporting the role pen from a message, the user may add or remove roles or user-IDs from the role pen.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
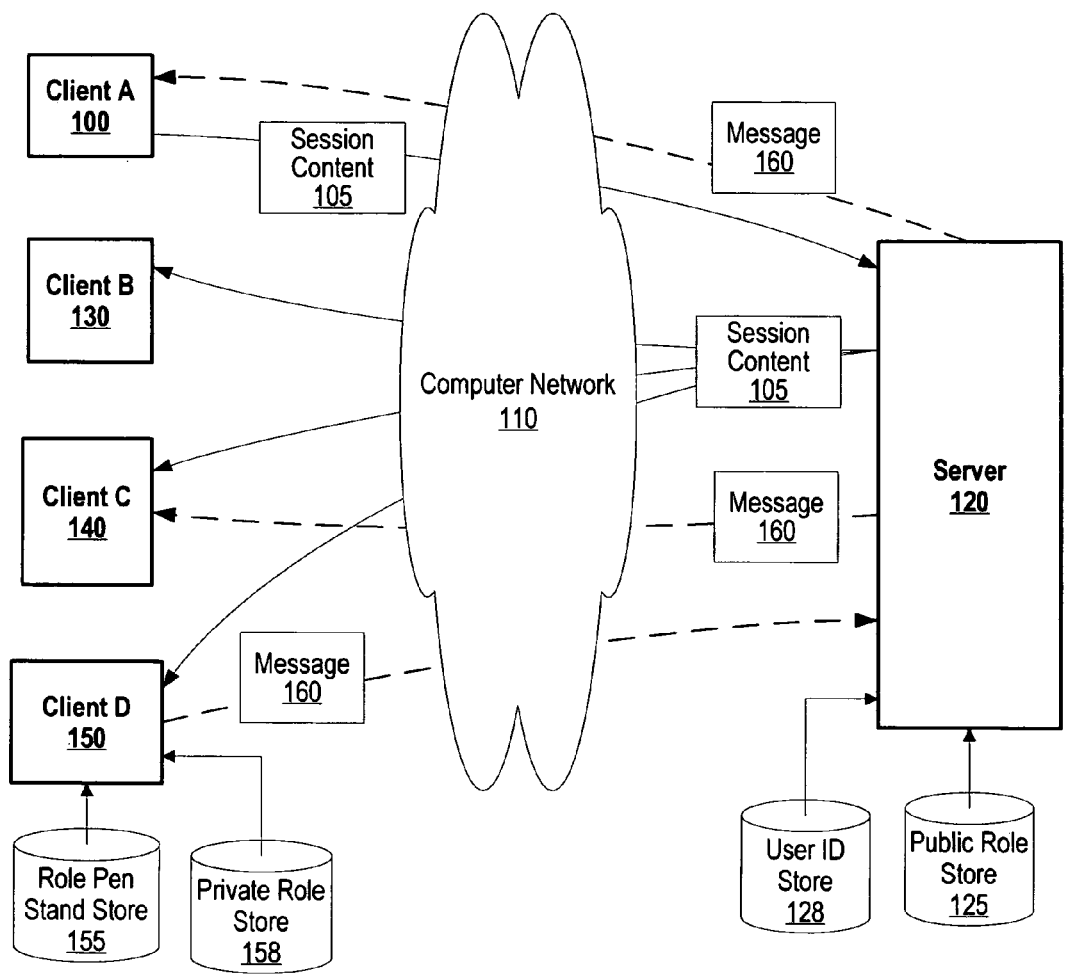
FIG. 1 is a diagram showing a plurality of clients collaborating in a distributed presentation and one of the clients sending a message to a subset of the plurality of clients.

FIG. 1 is a diagram showing a plurality of clients involved in a synchronous collaborative discussion and one of the clients sending a message to a subset of the plurality of clients. Server 120 supports a collaborative discussion, such as a distributed presentation, between client A 100, client B 130, client C 140, and client D 150. For example, users may use a distributed presentation tool on each of the clients, such as Lotus e-Meeting or Windows NetMeeting, in order for the users to collaborate on a particular topic.

Client A 100 initiates the discussion and sends session content 105 to server 120 through computer network 110, such as the Internet. Server 120 identifies the users that are participating in the distributed presentation, and sends session content 105 to client B 130, client C 140, and client D 150. For example, a company's division may be participating in a distributed presentation whereby users that correspond to each of the clients are part of the division.

Client D 150's user reviews session content 105 and wishes to send a message to a subset of the users. Client D 150's user creates a role pen and may associate one or more public roles, private roles, or user identifiers to the role pen. If client D 150 wishes to associate a public role to the role pen, such as "software department", client D 150 includes the public role identifier in a new role pen located in role pen stand store 155. Role pen stand store 155 may be stored on a nonvolatile storage area, such as a computer hard drive.

Client D 150 may also wish to associate a private role to the role pen, such as "product team." Client D 150 identifies a private role located in private role store 158, and includes a private role identifier in the new role pen located in role pen stand store 155. In addition, client D 150 may wish to add individual user identifiers to the new role pen, such as "co-op student." Client D 150's user selects the individual users and client D 150 includes corresponding user identifiers in the new role pen located in role pen stand store 155.

Client D 150 includes the public role identifier, user identifiers associated with a private role, and individual user identifiers in message 160. Client D 150 also includes client D 150's comment in message 160, and sends message 160 to server 120 through computer network 110, such as the Internet.

Server 120 retrieves user identifiers that correspond to the public role from public role store 125. User ID store 128 may be stored on a nonvolatile storage area, such as a computer hard drive. Server 120 then sends message 160 to users corresponding to the public role and other user identifiers included in message 160, such as client C 140 and client A 100. Message 160 also includes display attribute information which informs recipient clients how to display the comment.

Figure 2A:
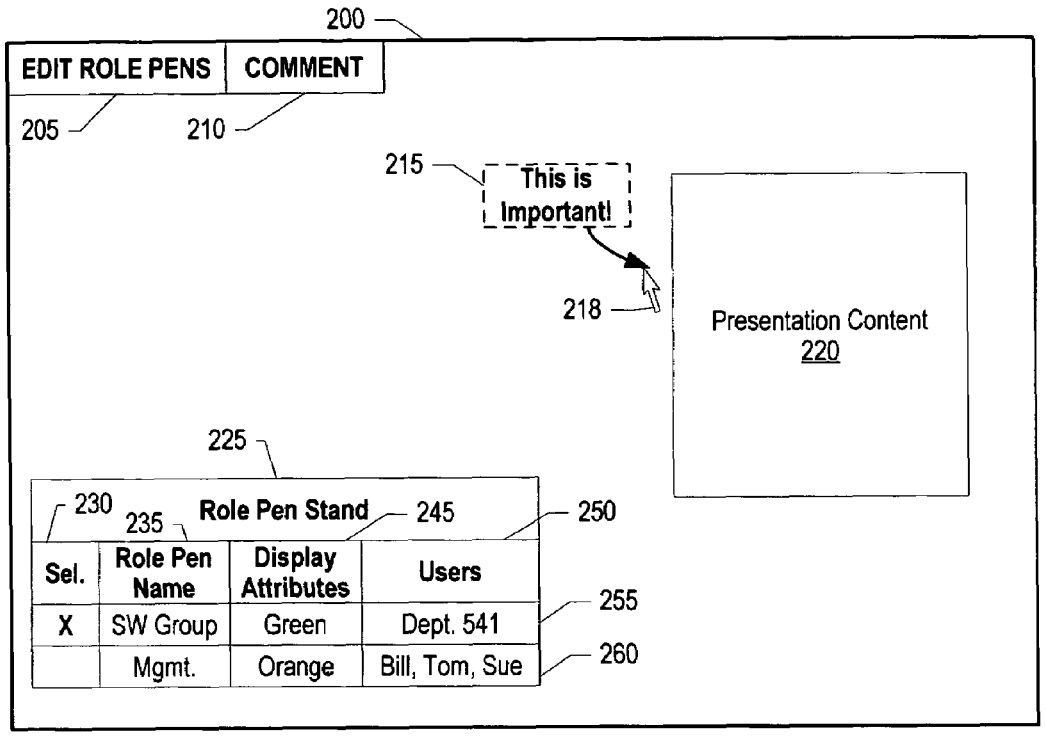
FIG. 2A is a display window showing a distributed presentation and corresponding role pen comments.

FIG. 2A is a user's display window that is sending a message during a synchronous collaborative session, such as a distributed presentation. Window 200 includes presentation content 220 which corresponds to a distributed presentation. Window 200 also includes buttons 205 and 210. A user selects button 205 if the user wishes to edit role pens in a role pen stand, such as adding or deleting a user identifiers corresponding to a role pen. A user selects button 210 if the user wishes to send a comment to one or more users corresponding to a particular role pen.

The example in FIG. 2A shows a user adding a comment in text box 215 "This is important!" and drawing an arrow to a particular part of presentation content 220 with pointer 218. The user selects a role pen to associate with his comment, and sends the comment to a subset of users corresponding to the selected role pen (see FIGS. 4, 5, and corresponding text for further details regarding role pen selection and message generation).

Window 200 includes role pen stand 225 which includes a list of role pens that correspond to presentation content 220. Role pen stand 225 includes columns 230 through 250. Column 230 shows which role pen a user has selected to send a comment. The example in FIG. 2A shows that the user has selected the first role pen "Software Group" to send the comments shown in window 200. Column 235 includes a list of role pen names that correspond to the active role pens. Column 345 includes a list of display attributes that correspond to each of the role pens, such as their color and font type. And, column 250 includes a list of user identifiers and public role identifiers that correspond to each active role pen.

Role pen stand 225 includes two active role pens that are shown in row 255 and row 260. Row 255 shows a role pen with a role pen name "Software group" with display attributes "green" that includes a public role identifier "department 541." Row 260 shows a role pen with a role pen name "management" with display attributes "orange" that includes individual user identifiers corresponding to "Bill", "Tom", and "Sue" (see FIG. 4 and corresponding text for further details regarding role pen creation).

Figure 2B:
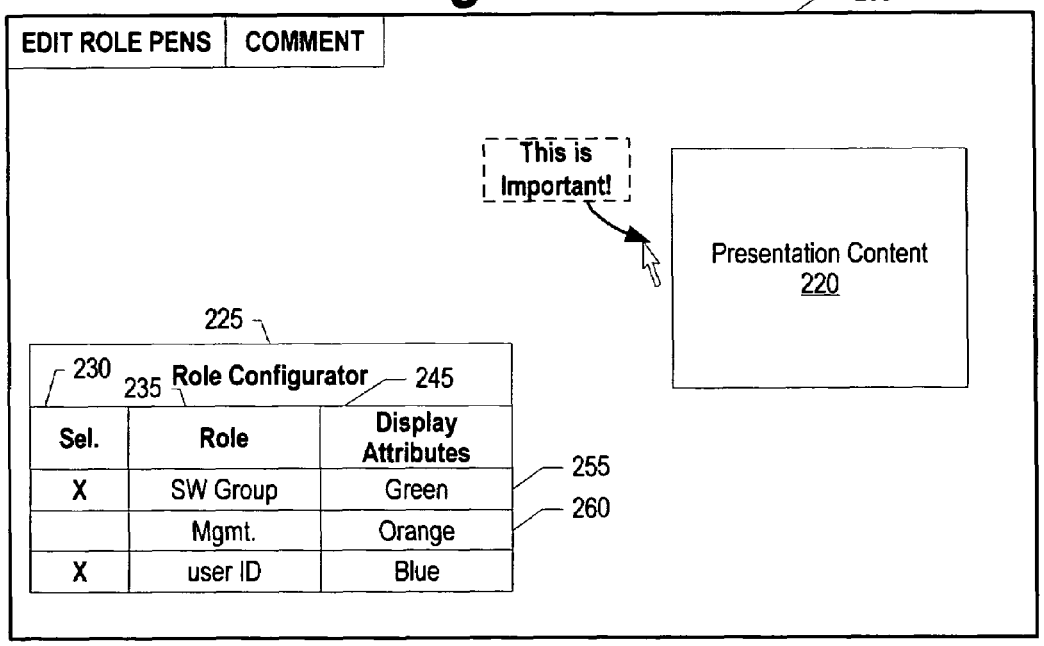
FIG. 2B is a user's display window that is receiving a message during a synchronous collaborative session.

FIG. 2B is a user's display window that is receiving a message during a synchronous collaborative session, such as a distributed presentation. Window 200 is similar to window 200 shown in FIG. 2A with the exception of role configuration table 225. Role configuration table 225 includes a list of roles that correspond to messages that the user receives. Column 230 shows which roles the user wishes to view corresponding messages. For example, a user may receive messages corresponding to ten roles but, however, the user only wishes to view messages corresponding to three of the ten roles. The example shown in FIG. 2B shows that the user wishes to view messages that correspond to roles "software group" and "user ID".

Column 235 includes a role name corresponding to messages that the user receives during the distributed presentation. The example in FIG. 2B shows that the user receives messages from role "software group", "management", and "user ID." Column 245 includes a list of display attributes that correspond to each role. A user uses the display attributes to identify which messages that are displayed in window 200 correspond with which roles.

Figure 3:
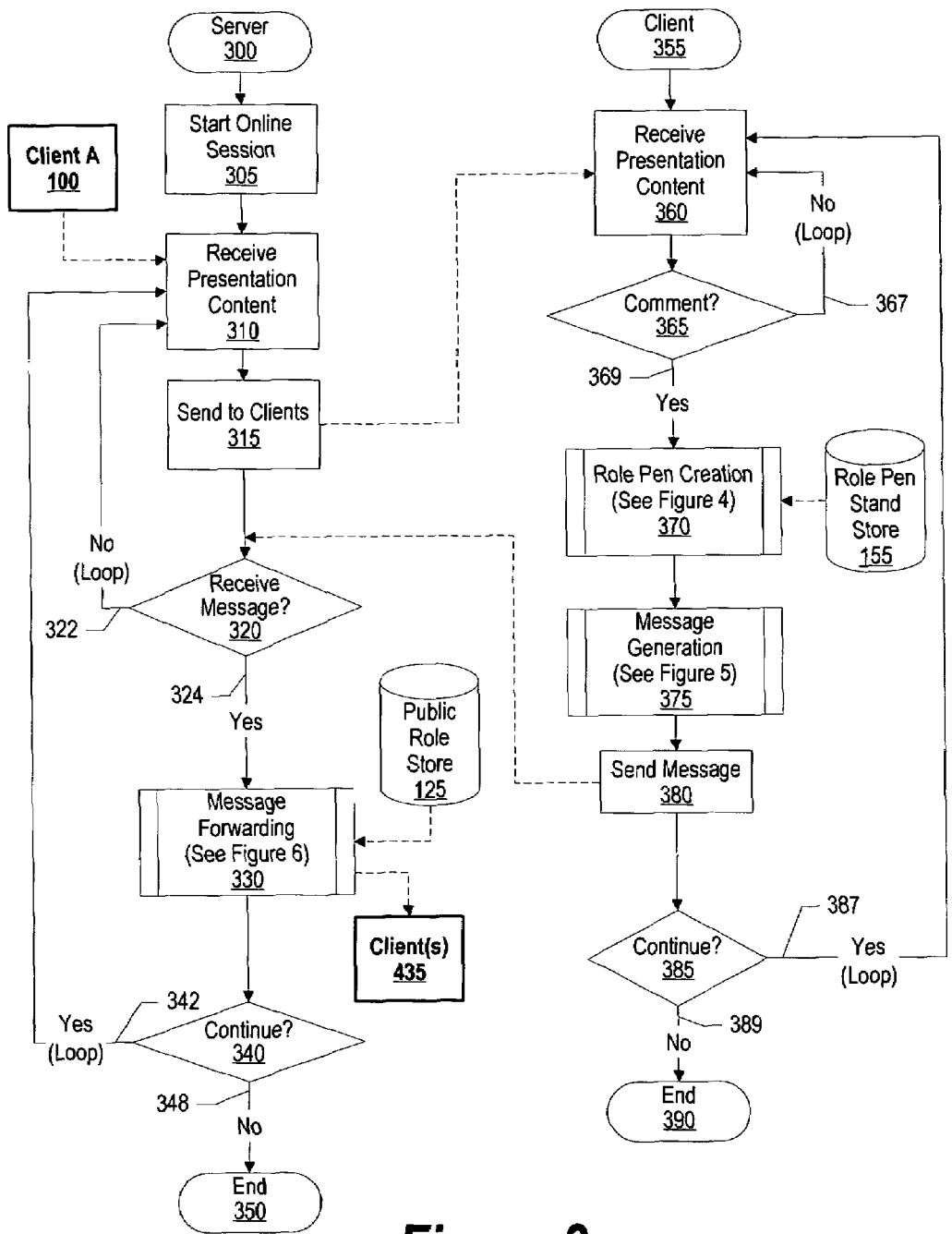
FIG. 3 is a high level flow chart showing steps taken in a server sending a distributed presentation to a client and receiving a message from the client.

FIG. 3 is a high level flow chart showing steps taken in a server sending a distributed presentation to a client and receiving a message from the client. Server processing commences at 300, whereupon the server invokes a distributed presentation at step 305. For example, users may use a distributed presentation tool, such as Lotus e-Meeting or Windows NetMeeting, in order for the users that are geographically separated to visually collaborate on a particular topic.

Processing receives presentation content from client A 100 at step 310. Client A 100 is the same as that shown in FIG. 1 whose user may be the leader of the distributed presentation. Processing sends the presentation to clients that are part of the distributed presentation at step 315. For example, a software department may be participating in the distributed presentation which discusses projects for the upcoming quarter.

Client processing commences at 355, whereupon the client receives the presentation content at step 360. Using the example described above, the client's user may be in the software department that is participating in the distributed presentation. A determination is made as to whether the user wishes to comment on the presentation content (decision 365). For example, the user may be a manager and wish to inform other users of information corresponding to a software opportunity.

If the user does not wish to comment on the presentation content, decision 365 branches to "No" branch 367 which loops back to receive more presentation content. This looping continues until the user wishes to comment on presentation content, at which point decision 365 branches to "Yes" branch 369. The user selects a role pen located in role pen stand store 155. The user may also create a new role pen for use in sending a comment to other users (pre-defined process block 370, see FIG. 4 and corresponding text for further details). Role pen stand store 155 is the same as that shown in FIGS. 1 and 2, respectively. The user generates a comment, and includes the comment in a message whereby the message corresponds to a particular role pen (pre-defined process block 375, see FIG. 5 and corresponding text for further details). The client then sends the message to the server at step 380.

A determination is made as to whether the client should continue participating in the distributed presentation (decision 385). If the client should continue participating, decision 385 branches to "Yes" branch 387 which loops back to participate in the distributed presentation. This looping continues until the client stops participating in the distributed presentation, at which point decision 385 branches to "No" branch 389 whereupon client processing ends at 390.

During the distributed presentation, the server makes a determination as to whether it receives a client message that corresponds to the distributed presentation (decision 320). If the server does not receive a client message, decision 320 branches to "No" branch 322 which loops back to process the distributed presentation. This looping continues until the server receives a client message, at which point decision 320 branches to "Yes" branch 324 whereupon the server process the message, and sends the message to client(s) 335. If the message corresponds to a public role pen, the server retrieves user identifiers from public role pen store 125 which identifies which clients to send the message (pre-defined process block 330, see FIG. 6 and corresponding text for further details). Public role pen store 125 is the same as that shown in FIG. 1 and may be stored on a nonvolatile storage area, such as a computer hard drive.

A determination is made as to whether the server should continue processing the distributed presentation (decision 340). If the server should continue processing the distributed presentation, decision 340 branches to "Yes" branch 342 which loops back to process the distributed presentation. This looping continues until the server stops processing the distributed presentation, at which point decision 340 branches to "No" branch 350 whereupon server processing ends at 350.

Figure 4:
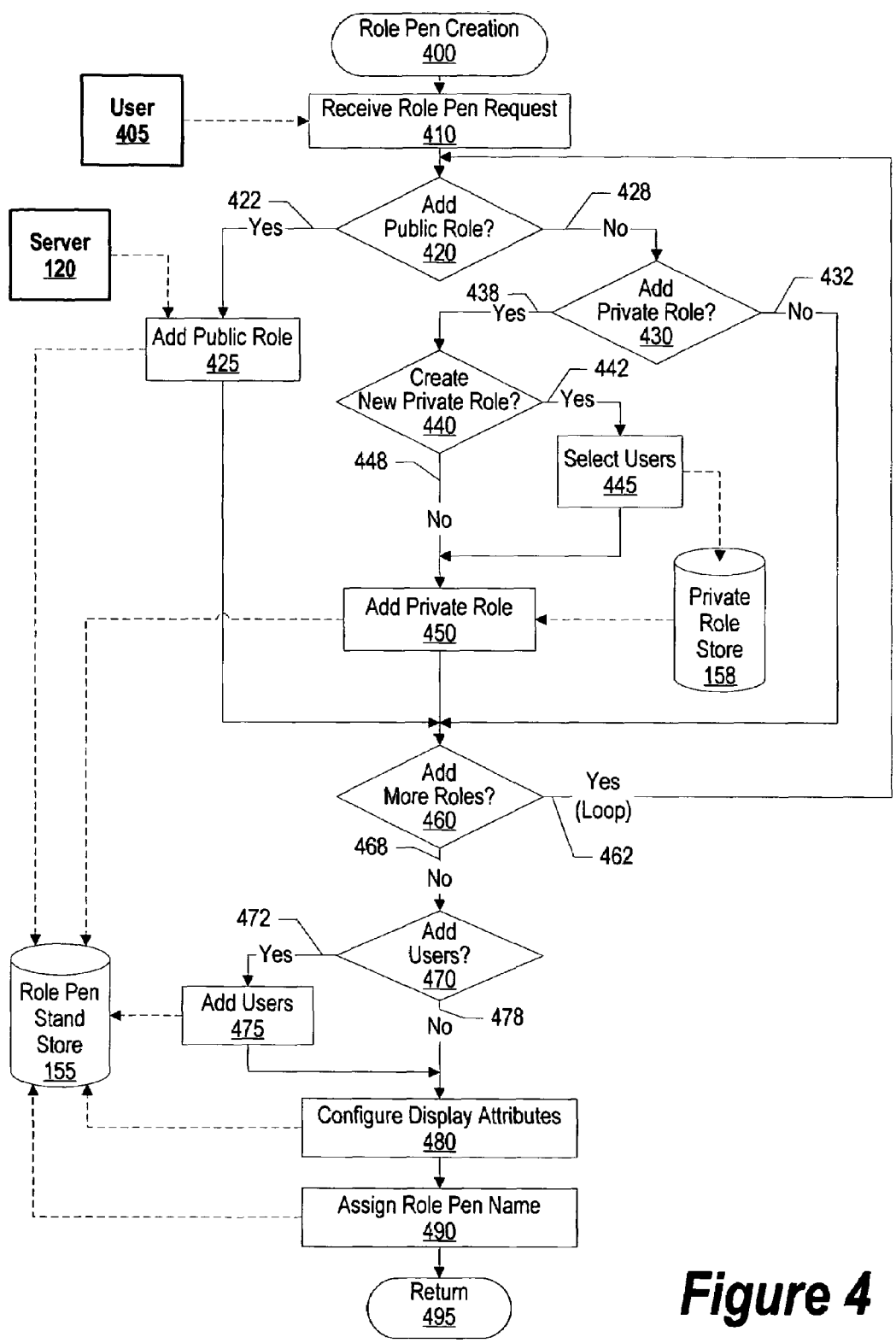
FIG. 4 is a flowchart showing steps taken in a role pen creation process.

FIG. 4 is a flowchart showing steps taken in a user creating a role pen. Role pen creation processing commences at 400, whereupon processing receives a role pen creation request from user 405 (step 410). A determination is made as to whether user 405 wishes to associate a public role to the new role pen (decision 420). For example, user 405 may wish to add his "software department" to the new role pen. If user 405 wishes to associate a public role to the new role pen, decision 420 branches to "Yes" branch 422 whereupon processing retrieves a public role identifier from server 120 and adds the public role identifier to the new role pen located in role pen stand store 155 at step 420. Role pen stand store 155 is the same as that shown in FIG. 1.

On the other hand, if user 405 does not wish to associate a public role to the role pen, decision 420 branches to "No" branch 428 whereupon a determination is made as to whether user 405 wishes to associate a private role to the role pen (decision 420). For example, user 405 may have a "product team" private role pen that includes user identifiers corresponding to each member of his product team. If the user does not wish to associate a private role to the role pen, decision 430 branches to "No" branch 432 bypassing private role addition steps. On the other hand, if user 405 wishes to associate a private role to the role pen, decision 430 branches to "Yes" branch 438 whereupon a determination is made as to whether user 405 wishes to create a new private role (decision 440). Using the example described above, user 405 may not have generated a product team private role but wishes to do so. If user 405 wishes to create a new private role, decision 440 branches to "Yes" branch 442 whereupon processing selects users corresponding to user 405's request, and stores them in private role store 158 as a new private role.

Processing adds a private role to the new role pen in role pen stand store 155 at step 460, and a determination is made as to whether user 405 wishes to add individual user identifiers to the new role pen (decision 470). For example, user 405 may be mentoring a co-op student whose user identifier is not included in a public role and is not included in user 405's private roles. In this example, user 405 may wish to add the co-op student to the new role pen. If user 405 wishes to add individual users to the new role pen, decision 470 branches to "Yes" branch 472 whereupon processing adds user identifiers corresponding to user 405's request to the new role pen located in role pen stand store 155. On the other hand, if user 405 does not wish to add individual user identifiers, decision 470 branches to "No" branch 478.

Processing configures display attributes corresponding to the new role pen at step 480. For example, processing may assign the color "green" and the font type "Helvetica 16" to the new role pen. Processing assigns a role pen name at step 490, and returns at 495.

Figure 5:
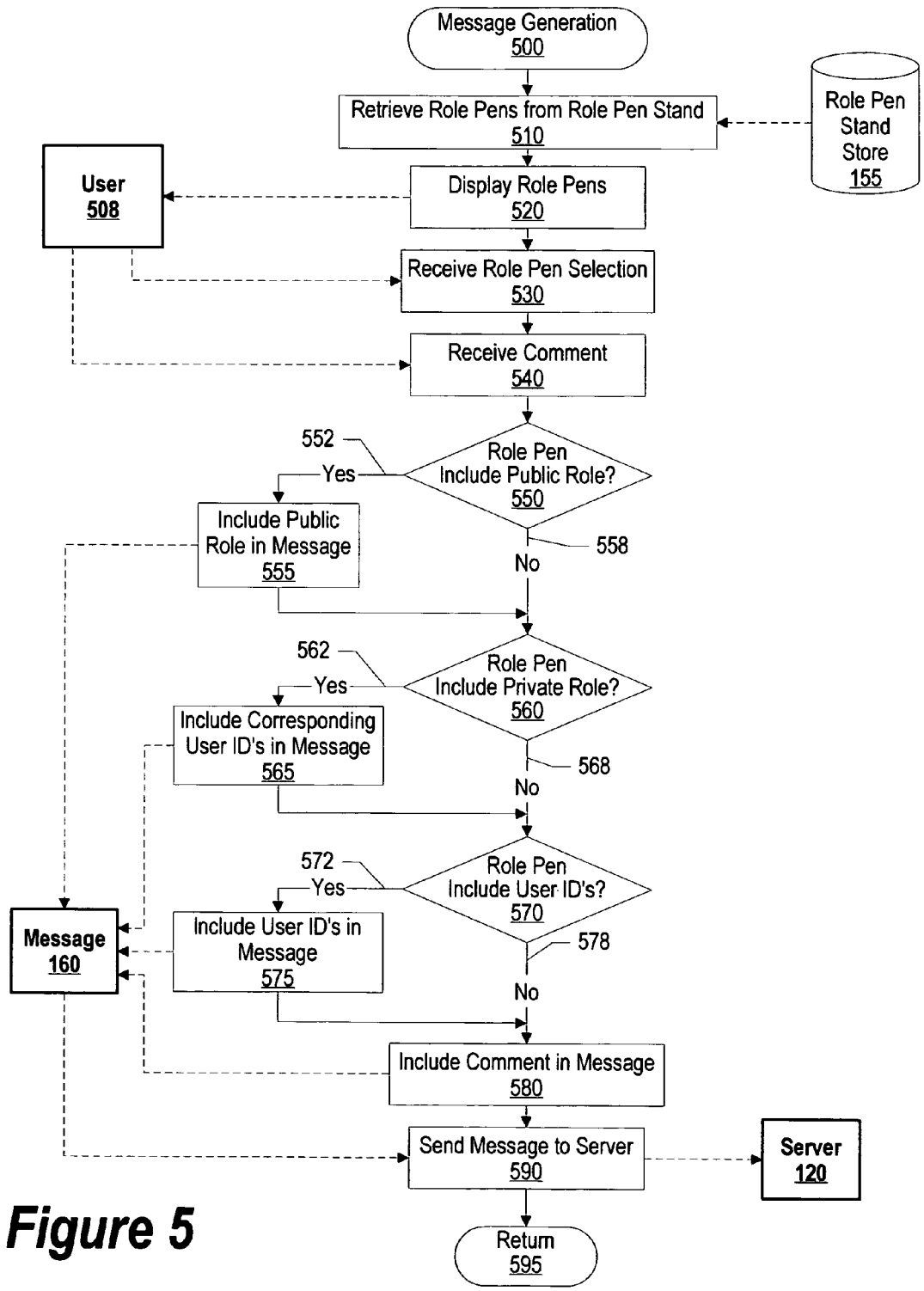
FIG. 5 is a flowchart showing steps taken in a client generating a message using a role pen and sending the message to a server for distribution.

FIG. 5 is a flowchart showing steps taken in a user generating a message using a role pen. Processing commences at 500, whereupon processing retrieves role pens from role pen stand store 155 at step 155. Role pen stand store 155 is the same as that shown in FIG. 1. Processing displays the role pens for user 508 to view at step 508 (see FIG. 2A and corresponding text for further details regarding displaying role pens). Processing receives a role pen selection from user 508 at step 530. In one embodiment, user 508 selects multiple role pens to correspond a message. Processing receives user 508's comment at step 540 which is generated using an input device, such as a keyboard, a mouse, or a stylus.

A determination is made as to whether user 508's selected role pen includes a corresponding public role, such as "software department" (decision 550). If user 508's selected role pen includes a public role, decision 550 branches to "Yes" branch 552 whereupon processing adds a public role identifier in message 160 at step 555. On the other hand, if user 508's selected role pen does not include a public role, decision 550 branches to "No" branch 558 bypassing public role addition steps.

A determination is made as to whether user 508's selected role pen includes a corresponding private role, such as "product team" (decision 560). If user 508's selected role pen includes a private role, decision 560 branches to "Yes" branch 562 whereupon processing includes user identifiers corresponding to the private role in message 160 at step 565. On the other hand, if user 508's selected role pen does not include a private role, decision 560 branches to "No" branch 568 bypassing private role addition steps.

A determination is made as to whether user 508's selected role pen includes one or more user identifiers corresponding to particular users, such as "co-op student" (decision 570). If user 508's selected role pen includes one or more user identifiers, decision 570 branches to "Yes" branch 572 whereupon processing includes the user identifiers in message 160 at step 575. On the other hand, if user 508's selected role pen does not include one or more user identifiers, decision 570 branches to "No" branch 578 bypassing user identifier addition steps.

Processing includes user 508's comment in message 160 at step 580, and sends message 160 to server 120 at step 590 to process. Processing returns at 595.

Figure 6:
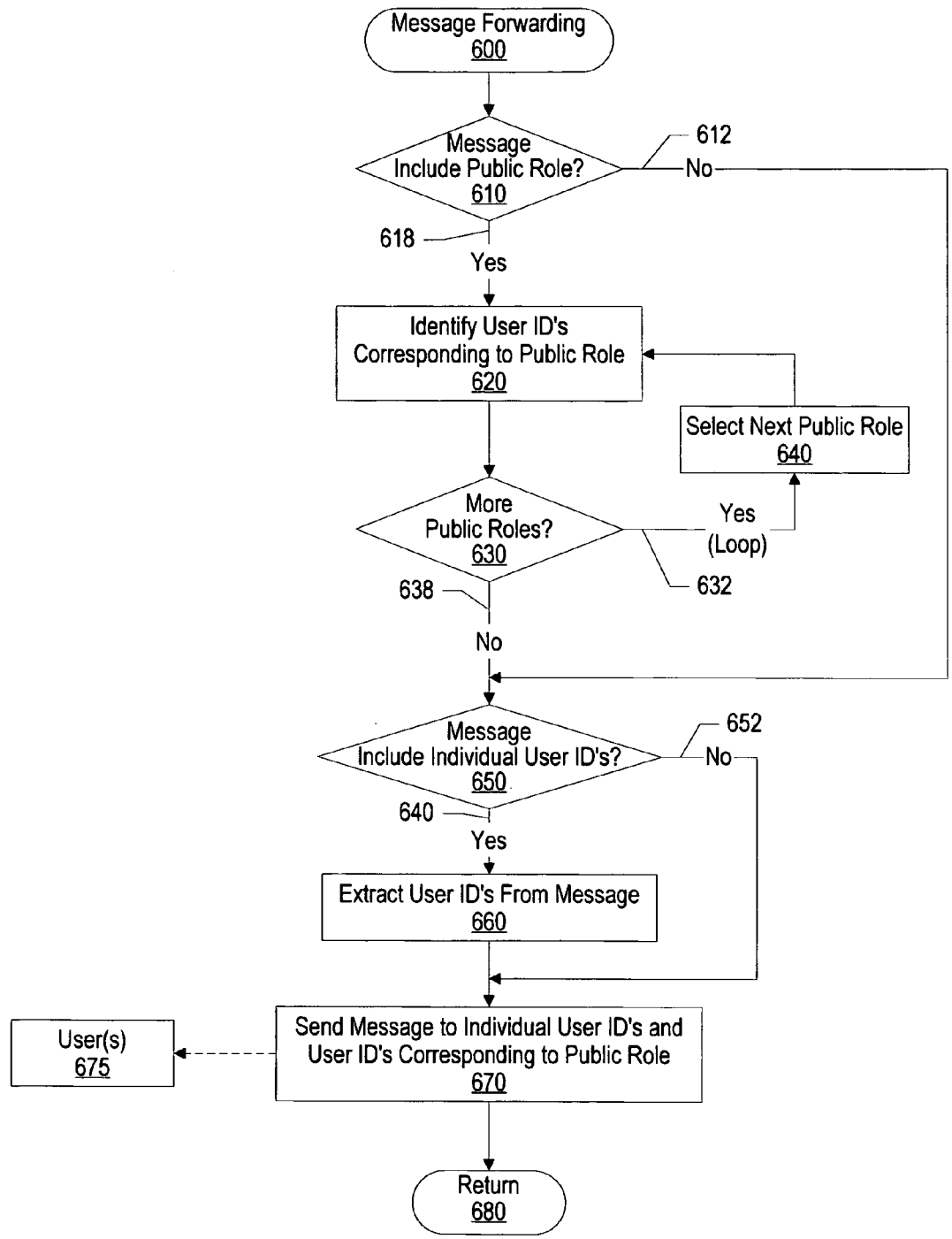
FIG. 6 is a flowchart showing steps taken in a server forwarding a message to one or more intended recipients.

FIG. 6 is a flowchart showing steps taken in a server forwarding a message to one or more users. Processing commences at 600, whereupon a determination is made as to whether the message includes a public role identifier, such as "software department" (decision 610). If the message does not include a public role identifier, decision 610 branches to "No" branch 612 bypassing user identifier-to-public role identification steps. On the other hand, if the message includes one or more public role identifiers, decision 610 branches to "Yes" branch 618 whereupon processing identifies user identifiers that correspond to the public role. For example, if the public role identifier is "software department", processing identifies users that correspond to the software department.

A determination is made as to whether there are more public roles included in the message (decision 630). If there are more public roles, decision 630 branches to "Yes" branch 632 whereupon processing loops back to select (step 640) and process the next public role. This looping continues until there are no more public roles to process, at which point decision 630 branches to "No" branch 638.

A determination is made as to whether the message includes individual user identifiers, such as "co-op student" (decision 650). If the message includes individual user identifiers, decision 650 branches to "Yes" branch 658 whereupon processing extracts the user identifiers from the message at step 660. On the other hand, if the message does not include individual user identifiers, decision 650 branches to "No" branch 652 bypassing user identifier extraction steps.

Processing sends the message to users 675 which correspond to the individual user identifiers as well as user identifiers that correspond to a public role (step 670). Processing returns at 680.

Figure 7:
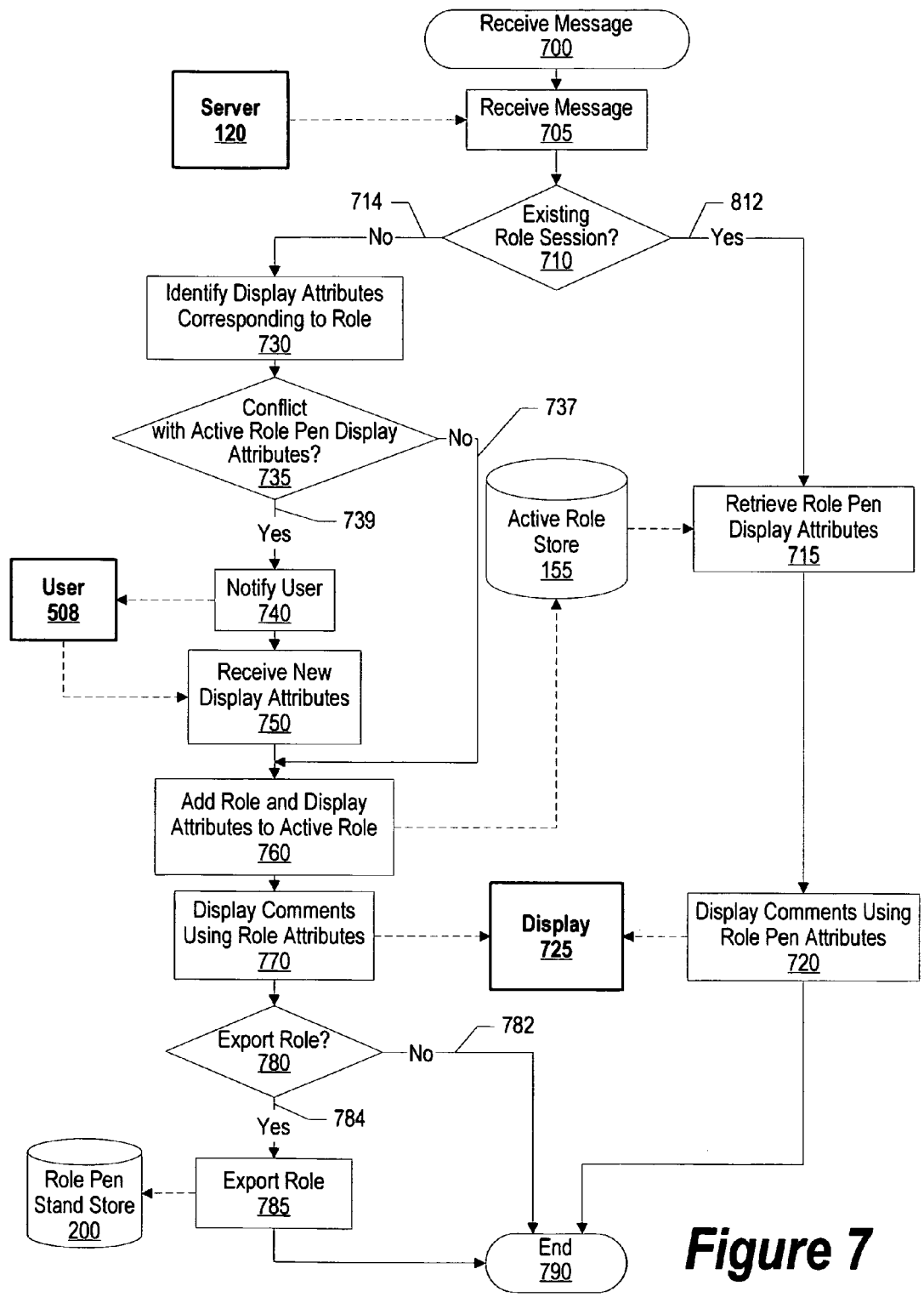
FIG. 7 is a flowchart showing steps taken in a client receiving a message and processing the message.

FIG. 7 is a flowchart showing steps taken in a client receiving a message and processing the message. Processing commences at 700, whereupon a client receives a message from server 120 at step 705. The message includes comments from a user that is participating in the same synchronous collaborative discussion as the client that receives the message. Server 120 is the same as that shown in FIG. 1.

A determination is made as to whether the message corresponds to an active role that is currently supported by the client (decision 710). If the message corresponds to an active role, decision 710 branches to "Yes" branch 712 whereupon processing retrieves display attributes corresponding to the role pen from active role store 718 (step 715), and displays the comments that are included in the message on display 725 using the display attributes (step 720). For example, a client may have an active role "software team" which has corresponding display attributes to instruct the client to display comments in green, Helvetica 16 point font. Active role store 718 may be stored on a nonvolatile storage area, such as a computer hard drive.

On the other hand, if the message does not correspond to an active role, decision 710 branches to "No" branch 714 whereupon processing identifies display attributes corresponding to the role at step 730. For example, the role may be a public role that has corresponding display attributes that a server manages whereby the public role's display attributes are "blue", "Sans Serif 14."

A determination is made as to whether the role's display attributes conflict with one of the other active role included in active role store 718 (decision 735). Using the example described above, processing determines whether there is an active role with display attributes "blue", "Sans Serif 14." If processing does not identify a display attribute conflict, decision 735 branches to "No" branch 737 bypassing display attribute-changing steps. On the other hand, if processing identifies a display attribute conflict, decision 735 branches to "Yes" branch 739 whereupon processing notifies user 508 of the display attribute conflict at step 740. User 508 is the same as that shown in FIG. 5. User 508 informs processing of new display attributes to associate with the new role at step 750.

Processing adds the new role and its corresponding display attributes in active role store 718 (step 760), and displays the comments using the corresponding display attributes on display 725 at step 770.

A determination is made as to whether user 508 wishes to export the role (decision 780). For example, a user may wish to export a role and add or remove one or more user identifiers from the copied role for later use. If user 508 wishes to export the role, decision 780 branches to "Yes" branch 784 whereupon processing exports the role and stores the exported role in private role pen store 200 (step 785). On the other hand, if the user does not wish to export the role, decision 780 branches to "No" branch 782 whereupon processing returns at 790.

In one embodiment, a distributed presentation has clients that support role pens. User $U_A$ creates a role pen $RP_{R1R2}$ and assigns roles $R_1$ and $R_2$ to the role pen. User $U_B$ is part of role $R_1$ and gets a messages written from $U_A$ using $RP_{R1R2}$, $U_B$ can export the roles and create a role pen using his presentation client. User $U_C$ is part of both roles $R_1$ and $R_2$. $U_A$'s and $U_B$'s message with $RP_{R1R2}$ should be displayed on his client in the same color. That is, the color of the message on his presentation window should depend on the pen used to write, and not on his role. Now $U_C$ creates the pen by exporting the roles from the messages he sees on his console and writes to $U_A$, $U_B$ and other users who have been assigned roles $R_1$ and $R_2$. The colors of the messages when displayed in the windows of the users have to be unique only in that window and the color on different windows may be different. For example the messages written with $RP_{R1R2}$ on the consoles of $U_A$ and $U_B$ could be of different colors. Suppose another role pen $RP_{R1R3}$ is used to send messages to $U_C$ if $U_C$ has also been assigned the role $R_3$ the messages written with this pen should have a different color from that of messages from $RP_{R1R2}$ on $U_C$'s console. If $U_C$ now wants to export the role from messages written with $RP_{R1R2}$, the color of the messages written by $RP_{R1R2}$ should be the same as those that are being delivered on his window written with the same pen from the other users. Of course, $U_C$ is free to change the color in his window for messages from $RP_{R1R2}$.

One way to implement the above embodiment is to extend the role pen stand to include information of pens being written to the client. For example, in the above-explained embodiment, $U_C$ is reading messages from $RP_{R1R2}$ and $RP_{R1R3}$. He hasn't created in his console $RP_{R1R3}$ to write. The role pen stand has information about both role pens associated with the window. Only the pens explicitly created by $U_C$, either by associating roles or exporting roles from messages, are displayed while the information about the other pens is hidden. Pens may also be tagged as read-only or read-write pens. Each time a message from a role-pen is sent to a client whose messages hadn't been received previously, the client adds the information about it in its role pen stand. The client assigns a color hitherto unassigned to any of the role pens. If the user wishes to export role information from messages written with a read-only pen, the tag is changed to read-write and the pen information is made visible to the user. If a user wishes to know the role and users associated with the messages of a pen (read-only or read-write), a user accesses the information from the role pen stand. Information about read-only pens may be stored just for the duration of the session.

Figure 8:
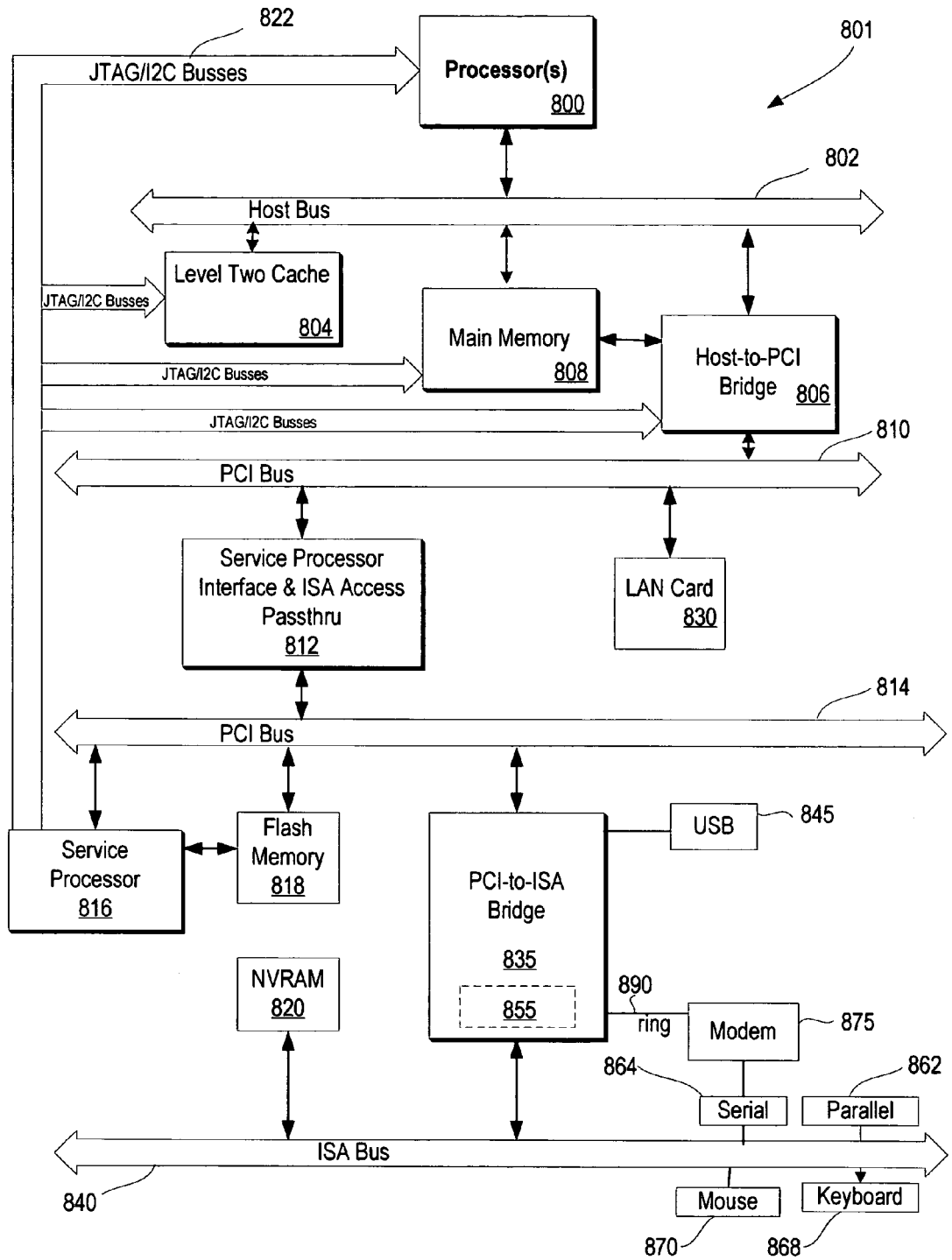
FIG. 8 is a block diagram of an information handling system capable of implementing the present invention.

FIG. 8 illustrates information handling system 801 which is a simplified example of a computer system capable of performing the computing operations described herein. Computer system 801 includes processor 800 which is coupled to host bus 802. A level two (L2) cache memory 804 is also coupled to host bus 802. Host-to-PCI bridge 806 is coupled to main memory 808, includes cache memory and main memory control functions, and provides bus control to handle transfers among PCI bus 810, processor 800, L2 cache 804, main memory 808, and host bus 802. Main memory 808 is coupled to Host-to-PCI bridge 806 as well as host bus 802. Devices used solely by host processor(s) 800, such as LAN card 830, are coupled to PCI bus 810. Service Processor Interface and ISA Access Pass-through 812 provides an interface between PCI bus 810 and PCI bus 814. In this manner, PCI bus 814 is insulated from PCI bus 810. Devices, such as flash memory 818, are coupled to PCI bus 814. In one implementation, flash memory 818 includes BIOS code that incorporates the necessary processor executable code for a variety of low-level system functions and system boot functions.

PCI bus 814 provides an interface for a variety of devices that are shared by host processor(s) 800 and Service Processor 816 including, for example, flash memory 818. PCI-to-ISA bridge 835 provides bus control to handle transfers between PCI bus 814 and ISA bus 840, universal serial bus (USB) functionality 845, power management functionality 855, and can include other functional elements not shown, such as a real-time clock (RTC), DMA control, interrupt support, and system management bus support. Nonvolatile RAM 820 is attached to ISA Bus 840. Service Processor 816 includes JTAG and I2C busses 822 for communication with processor(s) 800 during initialization steps. JTAG/I2C busses 822 are also coupled to L2 cache 804, Host-to-PCI bridge 806, and main memory 808 providing a communications path between the processor, the Service Processor, the L2 cache, the Host-to-PCI bridge, and the main memory. Service Processor 816 also has access to system power resources for powering down information handling device 801.

Peripheral devices and input/output (I/O) devices can be attached to various interfaces (e.g., parallel interface 862, serial interface 864, keyboard interface 868, and mouse interface 870 coupled to ISA bus 840. Alternatively, many I/O devices can be accommodated by a super I/O controller (not shown) attached to ISA bus 840.

In order to attach computer system 801 to another computer system to copy files over a network, LAN card 830 is coupled to PCI bus 810. Similarly, to connect computer system 801 to an ISP to connect to the Internet using a telephone line connection, modem 875 is connected to serial port 864 and PCI-to-ISA Bridge 835.

While the computer system described in FIG. 8 is capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer implemented method comprising:
   joining a collaborative discussion, the collaborative discussion corresponding to a plurality of user identifiers;
   selecting a first role pen, wherein the first role pen corresponds to a first subset of the plurality of user identifiers;
   registering one or more of the plurality of user identifiers to a private role;
   associating the private role to the first role pen;
   generating a first message corresponding to the first role pen;
   sending the first message to one or more recipient users that correspond to the first role pen, wherein the first message includes a comment, and wherein the comment is displayed at one or more recipient clients in the same display window as the collaborative session, the recipient clients corresponding to the recipient users;
   receiving a second message, wherein the second message corresponds to a second role pen;
   exporting the second role pen, the second role pen corresponding to a second subset of the plurality of user identifiers;
   determining whether to add one or more user identifiers from the plurality of user identifiers to the second role pen; and
   adding one or more user identifiers to the second role pen in response to the determination.

2. An information handling system comprising:
   one or more processors;
   a memory accessible by the processors;
   one or more nonvolatile storage devices accessible by the processors; and
   a selective collaboration tool for conversing with a subset of users, the selective collaboration tool comprising software code effective to:
      join a collaborative discussion, the collaborative discussion corresponding to a plurality of user identifiers;
      select a first role pen from one of the nonvolatile storage areas, wherein the first role pen corresponds to a first subset of the plurality of user identifiers;
      register one or more of the plurality of user identifiers to a private role;
      associate the private role to the first role pen located in one of the nonvolatile storage areas;
      generate a first message corresponding to the first role pen;
      send the first message to one or more recipient users that correspond to the first role pen, wherein the first message includes a comment, and
      wherein the comment is displayed at one or more recipient clients in the same display window as the collaborative session, the recipient clients corresponding to the recipient users;
      receive a second message, wherein the second message corresponds to a second role pen;
      export the second role pen, the second role pen corresponding to a second subset of the plurality of user identifiers;
      determine whether to add one or more user identifiers from the plurality of user identifiers to the second role pen; and
      add one or more user identifiers to the second role pen in response to the determination.

3. A computer program product stored on a computer readable storage media for conversing with users, said computer program product comprising software code that, when executed by an information handling system, is effective to:
   join a collaborative discussion, the collaborative discussion corresponding to a plurality of user identifiers;
   select a first role pen, wherein the first role pen corresponds to a first subset of the plurality of user identifiers;
   register one or more of the plurality of user identifiers to a private role;
   associate the private role to the first role pen;
   generate a first message corresponding to the first role pen;
   send the first message to one or more recipient users that correspond to the first role pen, wherein the first message includes a comment, and wherein the comment is displayed at one or more recipient clients in the same display window as the collaborative session, the recipient clients corresponding to the recipient users;
   receive a second message, wherein the second message corresponds to a second role pen;
   export the second role pen, the second role pen corresponding to a second subset of the plurality of user identifiers;
   determine whether to add one or more user identifiers from the plurality of user identifiers to the second role pen; and
   add one or more user identifiers to the second role pen in response to the determination.

* * * * *